(12) United States Patent
Goode et al.

(10) Patent No.: US 9,787,578 B2
(45) Date of Patent: Oct. 10, 2017

(54) SYSTEMS AND METHODS OF IPV6 MAPPING

(75) Inventors: Brandon Hall Goode, Canton, GA (US); Robert Clark Whitten, Kennesaw, GA (US)

(73) Assignee: Cox Communications, Inc., Atlanta, GA (US)

( * ) Notice: Subject to any disclaimer, the term of this patent is extended or adjusted under 35 U.S.C. 154(b) by 1007 days.

(21) Appl. No.: 13/533,557

(22) Filed: Jun. 26, 2012

(65) Prior Publication Data
US 2013/0343391 A1 Dec. 26, 2013

(51) Int. Cl.
*H04L 12/725* (2013.01)

(52) U.S. Cl.
CPC .................... *H04L 45/306* (2013.01)

(58) Field of Classification Search
CPC ......... H04L 29/12358; H04L 29/12915; H04L 69/167; H04L 61/2503; H04L 61/251; H04L 45/306
USPC .... 370/310, 343, 349, 351, 389, 392, 395.1, 370/395.5, 395.54, 464, 465, 470, 471, 370/474
See application file for complete search history.

(56) References Cited

U.S. PATENT DOCUMENTS

| | | | |
|---|---|---|---|
| 2002/0083198 A1* | 6/2002 | Kim et al. .................... | 709/245 |
| 2003/0149790 A1* | 8/2003 | Hwang ........................ | 709/245 |
| 2005/0111377 A1* | 5/2005 | Lioy et al. .................... | 370/252 |
| 2006/0104243 A1* | 5/2006 | Park ............................. | 370/331 |
| 2006/0198351 A1* | 9/2006 | Baek ............................ | 370/338 |
| 2007/0076724 A1* | 4/2007 | Hall et al. ............... | 370/395.52 |
| 2010/0226310 A1* | 9/2010 | Kuparinen et al. ........... | 370/328 |
| 2013/0136114 A1* | 5/2013 | Hietalahti .............. | H04W 4/22 370/338 |

* cited by examiner

*Primary Examiner* — Obaidul Huq
(74) *Attorney, Agent, or Firm* — Benjamin A. Balser; Next IP Law Group

(57) ABSTRACT

Example embodiments of the systems and methods of IPv6 mapping disclosed herein involve computing an IPv6 source and/or destination address based on the type of service being used by the user, which is derived from the digits input to the device by the user or system, and the destination phone number input by the user. The mapping is done in second half (for example, 64 bits) of the IPv6 address (the interface ID). The first half of the IPv6 address is a defined subnet (known as a "prefix" in IPv6 terms) for phone number routing. The subnet comprises a global routing prefix and a subnet identification. The interface ID is split into three sections: an identifier, a country code, and an end point number.

16 Claims, 1 Drawing Sheet

SYSTEMS AND METHODS OF IPV6 MAPPING

TECHNICAL FIELD

The present disclosure is generally related to telecommunications and, more particularly, is related to Internet Protocol standards.

BACKGROUND

The Internet Protocol (IP) is the principal communications protocol used for relaying datagrams (also known as network packets) across an internetwork using the Internet Protocol Suite. Responsible for routing packets across network boundaries, it is the primary protocol that establishes the Internet.

IP is the primary protocol in the Internet Layer of the Internet Protocol Suite and has the task of delivering datagrams from the source host to the destination host solely based on the addresses. For this purpose, IP defines datagram structures that encapsulate the data to be delivered. It also defines addressing methods that are used to label the datagram source and destination.

The first major version of IP, Internet Protocol Version 4 (IPv4), is the dominant protocol of the internet. Internet Protocol version 4 (IPv4) is the fourth revision in the development of the Internet Protocol (IP) and the first version of the protocol to be widely deployed. Together with IPv6, it is at the core of standards-based internetworking methods of the Internet. As of 2012 IPv4 is still the most widely deployed Internet Layer protocol.

IPv4 is a connectionless protocol for use on packet-switched Link Layer networks (e.g., Ethernet). It operates on a best effort delivery model, in that it does not guarantee delivery, nor does it assure proper sequencing or avoidance of duplicate delivery. IPv4 uses 32-bit (four-byte) addresses, which limits the address space to 4,294,967,296 ($2^{32}$) addresses. Addresses were assigned to users, and the number of unassigned addresses decreased. IPv4 address exhaustion from Internet Assigned Numbers Authority occurred on Feb. 3, 2011. It had been significantly delayed by address changes such as classful network design, Classless Inter-Domain Routing, and network address translation (NAT). This limitation of IPv4 stimulated the development of IPv6 in the 1990s, which has been in commercial deployment since 2006.

IPv4 reserves special address blocks for private networks (~18 million addresses) and multicast addresses (~270 million addresses). IPv4 addresses may be written in any notation expressing a 32-bit integer value, but for human convenience, they are most often written in the dot-decimal notation, which consists of four octets of the address expressed individually in decimal and separated by periods (for example, 192.168.1.1).

The Internet operates by transferring data between hosts in packets that are routed across networks as specified by routing protocols. These packets require an addressing scheme, such as IPv4 or IPv6, to specify their source and destination addresses. Each host, computer or other device on the Internet requires an IP address in order to communicate. The growth of the Internet has created a need for more addresses than are possible with IPv4.

IPv6 was developed by the Internet Engineering Task Force (IETF) to deal with this long-anticipated IPv4 address exhaustion, and is described in Internet standard document RFC 2460, published in December 1998. Like IPv4, IPv6 is an internet-layer protocol for packet-switched internetworking and provides end-to-end datagram transmission across multiple IP networks. While IPv4 allows 32 bits for an IP address, and therefore has $2^{32}$ (4,294,967,296) possible addresses, IPv6 uses 128-bit addresses, for an address space of $2^{128}$ (approximately $3.4\times10^{38}$) addresses. This expansion allows for many more devices and users on the internet as well as extra flexibility in allocating addresses and efficiency for routing traffic. It also eliminates the primary need for network address translation (NAT), which gained widespread deployment as an effort to alleviate IPv4 address exhaustion. There are heretofore unaddressed needs with previous solutions in mapping users to IPV6 addresses.

SUMMARY

Example embodiments of the present disclosure provide systems of IPv6 mapping. Briefly described, in architecture, one example embodiment of the system, among others, can be implemented as follows: a router configured to: receive a digital packet; convert the digital packet to an IPv6 address, the IPv6 address comprising a subnet prefix and an interface identifier, the interface identifier comprising an identifier, a country code, and a number; and transmit the digital packet.

Embodiments of the present disclosure can also be viewed as providing methods for IPv6 mapping. In this regard, one embodiment of such a method, among others, can be broadly summarized by the following steps: receiving a digital packet; converting the digital packet to an IPv6 address, the IPv6 address comprising a subnet prefix and an interface identifier, the interface identifier comprising an identifier, a country code, and a number; and transmitting the digital packet.

DETAILED DESCRIPTION

Embodiments of the present disclosure will be described more fully hereinafter with reference to the accompanying drawings in which like numerals represent like elements throughout the several figures, and in which example embodiments are shown. Embodiments of the claims may, however, be embodied in many different forms and should not be construed as limited to the embodiments set forth herein. The examples set forth herein are non-limiting examples and are merely examples among other possible examples.

Example embodiments of the systems and methods of IPv6 mapping disclosed herein enable communication between telecommunications devices by mapping a telephone number into a standardized format for an IPv6 address. Communication between two devices based on a telephone number currently requires one device (origination device) to have knowledge of another device (termination device) whose IP address is not algorithmically determinable. The current solutions for the communication from the origination device to the termination device require either: 1) an additional device containing information about communication with the termination device to be used by the origination device (an ENUM server, an application server, etc.); or 2) for the origination device to be programmed or configured to have knowledge of the termination device. Neither solution allows the origination device to simply figure out how to communicate directly with the termination device without special knowledge, configuration, or services. Example embodiments of the systems and methods of IPv6 mapping disclosed herein decrease the complexity of the core network, enable rapid service deployment, reduce the capital investment in the service and reduce the operational investment in the service.

With IPV4 mapping, there is no tracking of an IP address that is in a particular area. Therefore, an IP address is not tied to a particular address or service provider. An assigned IPV4 address could be located anywhere in the world. An identifiable location is important to carriers for 911 location tracking, for example. The IPV6 address may be tied directly to a user's phone number.

Figure 1:
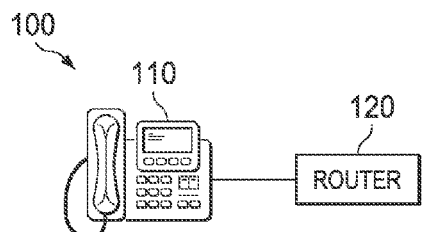
FIG. 1 is a system diagram of an example embodiment of a IP phone connected to a router.

Example embodiments of the systems and methods of IPv6 mapping disclosed herein involve computing an IPv6 source and/or destination address based on the type of service being used by the user, which is derived from the digits input to the device by the user or system, and the destination phone number input by the user. In the example embodiment end user configuration 100 provided in FIG. 1, Telephone 110 is connected to router 120, which is connected to the Internet. Router 120 provides the IPv6 address for the call placed by telephone 110. In an alternative embodiment, the address assigning module is embodied in telephone 110.

Figure 2:
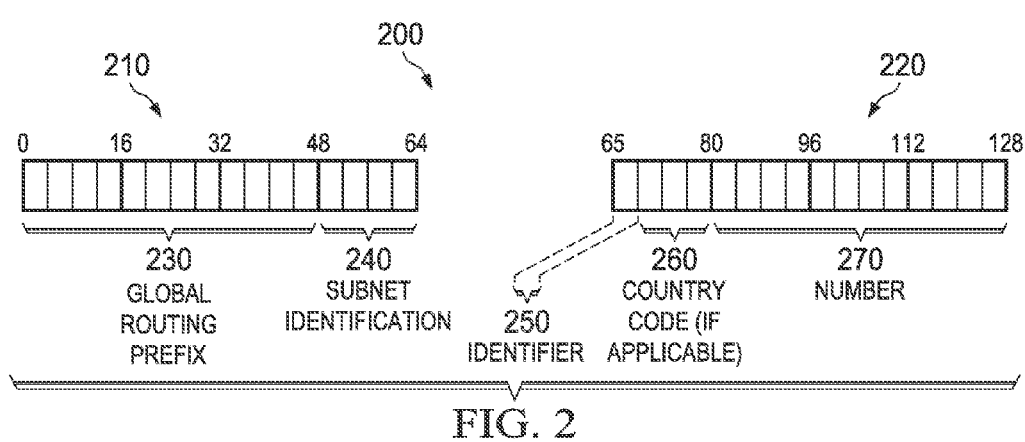
FIG. 2 is a diagram of an example embodiment of an IPv6 packet.

In an example embodiment provided in FIG. 2, the mapping is done in second half 220 (for example, 64 bits) of the IPv6 address (the interface ID). The first half of the IPv6 address is defined subnet 210 (known as a "prefix" in IPv6 terms) for phone number routing. Subnet 210 comprises global routing prefix 230 and subnet identification 240. In the example embodiment of FIG. 2, interface ID 220 is split into three sections: identifier 250, country code 260, and number 270. Identifier 250 (first byte) describes the service type for the call. Non-limiting example service types are emergency 911, dial around, star code, international operator, long distance operator, local operator, or just a standard call. Country code 260 is contained in the next three bytes, for example. The remaining twelve bytes are used for the endpoint number 270. In an example embodiment, both country code 260 and number 270 are encoded as a base 10 number (i.e. 1234 is encoded as 0x1234, not 0x04D2).

All call types except dial around calls may be contained within the 64 bt value. Dial around call types may be mapped to two IPv6 addresses. The first address is the address of the carrier identified in the dial around. A second IPv6 address may be created for the destination number. The second IPv6 packet may be encapsulated in the first IPv6 packet. Encapsulation may be done using several IPv6 standards. In an example embodiment, the IPv6 Route Header Extension is used. In another example embodiment, the second IPv6 packet is treated as the data contained in the first IPv6 packet.

In an example embodiment, when a call is placed, the endpoint is responsible for encoding the dialed digits into the destination address. This message is then sent using standard IPv6 routing. Each device contains one or more IPv6 mappings for numbers it owns. Application servers may have an IPv6 address for each service for which it is responsible. If a number does not exist in the network, the call may be routed to a default gateway. The gateway may map the IPv6 address to a legacy network (IPv4, VoIP, TDM, etc.).

Figure 3:
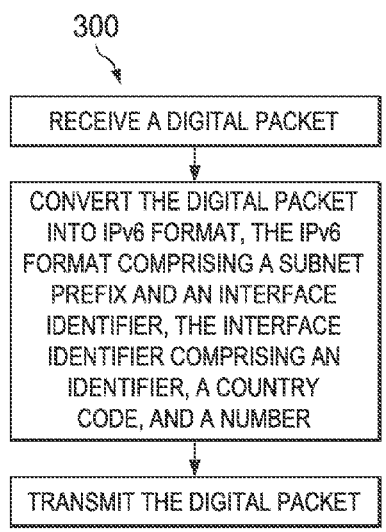
FIG. 3 is a flow diagram of an example embodiment of a method of an IPv6 mapping.

FIG. 3 provides flow diagram 300 of an example embodiment of a method of IPv6 mapping. In block 310, a digital packet is received. In block 320, the digital packet is converted into IPv6 format, the IPv6 format comprising a subnet prefix and an interface identifier, the interface identifier comprising an identifier, a country code, and a number. In block 330, the converted digital packet is transmitted.

Although the present disclosure has been described in detail, it should be understood that various changes, substitutions and alterations can be made thereto without departing from the spirit and scope of the disclosure as defined by the appended claims.

Therefore, at least the following is claimed:

1. A method comprising:
receiving a digital packet;
converting the digital packet to an 1Pv6 address, the 1Pv6 address comprising a subnet prefix and an interface identifier, the interface identifier comprising a telephone service type identifier, a country code, and a number, the telephone service type identifier comprising at least one of an operator, a long distance operator, an international operator, a star function, and dial around; and transmitting the digital packet.

2. The method of claim 1, wherein the identifier consists of the most significant byte.

3. The method of claim 1, wherein a dial around service is mapped into a first 1Pv6 packet and a second 1Pv6 packet.

4. The method of claim 3, wherein the first IPv6 packet address identifies a carrier and the second IPv6 packet address identifies a destination number.

5. The method of claim 4, wherein the second IPv6 packet is encapsulated in the first IPv6 packet.

6. The method of claim 1, wherein the country code comprises three bytes.

7. The method of claim 1, wherein the number comprises 12 bytes.

8. A system comprising:
a router configured to:
receive a digital packet;
convert the digital packet to an 1Pv6 address, the 1Pv6 address comprising a subnet prefix and an interface identifier, the interface identifier comprising a telephone service type identifier, a country code, and a number, the telephone service type identifier comprising at least one of an operator, a long distance operator, an international operator, a star function, and dial around; and transmit the digital packet.

9. The system of claim 8, wherein the identifier consists of the most significant byte.

10. The system of claim 8, wherein a dial around service is mapped into a first 1Pv6 packet and a second 1Pv6 packet.

11. The system of claim 10, wherein the first IPv6 packet address identifies a carrier and the second IPv6 packet address identifies a destination number.

12. The system of claim 11, wherein the second IPv6 packet is encapsulated in the first IPv6 packet.

13. The system of claim 8, wherein the country code comprises three bytes.

14. The system of claim 8, wherein the number comprises 12 bytes.

15. A system comprising:
means for receiving a digital packet;
means for converting the digital packet to an 1Pv6 address, the 1Pv6 address comprising a subnet prefix and an interface identifier, the interface identifier comprising a telephone service type identifier, a country code, and a number, the telephone service type identifier comprising at least one of an operator, a long distance operator, an international operator, a star function, and dial around; and means for transmitting the digital packet.

16. The system of claim 15, wherein the telephone service comprises a dial around service mapped into a first IPv6 packet address identifying a carrier and a second IPv6 packet address identifying a destination number, the second IPv6 packet encapsulated in the first IPv6 packet.

* * * * *